B. P. FORTIN.
MULTIPLE TOOL HEAD FOR DRILL PRESSES.
APPLICATION FILED DEC. 12, 1917.

1,326,398.

Patented Dec. 30, 1919.

Inventor
Benjamin P. Fortin
Harry P. Williams
Attorney

UNITED STATES PATENT OFFICE.

BENJAMIN P. FORTIN, OF HARTFORD, CONNECTICUT.

MULTIPLE TOOL-HEAD FOR DRILL-PRESSES.

1,326,398. Specification of Letters Patent. Patented Dec. 30, 1919.

Application filed December 12, 1917. Serial No. 206,751.

*To all whom it may concern:*

Be it known that I, BENJAMIN P. FORTIN, a citizen of the United States, residing at Hartford, in the county of Hartford and State of Connecticut, have invented a new and useful Improvement in Multiple Tool-Heads for Drill-Presses, of which the following is a specification.

This invention relates to the construction of those tool heads which have a member that is provided with a driving stem and transmission gears and is designed to be secured to the reciprocatory feed-sleeve of a drill press with the driving stem engaged with the rotatory drill spindle, and a member that carries a number of angularly disposed chuck spindles provided with gears and which is pivotally mounted on the other member in such manner that any one of the chuck spindles may be revolved into line with the driving stem and its gear engaged with the transmission gears so that the tool held by that chuck spindle will be driven by the drill spindle.

The object of this invention is to provide a head of this nature which is cheap to manufacture, easy to apply to a drill press, quick to adjust so that any one of several tools may be brought into line with the drill press spindle for use, which is very compact so that it does not limit the working space between the table and the drill press spindle to any practical extent, and which is so designed that the tools which it carries do not project in such manner as to render them dangerous, or to inconvenience an operator working with the head attached to a drill press.

Figure 1:
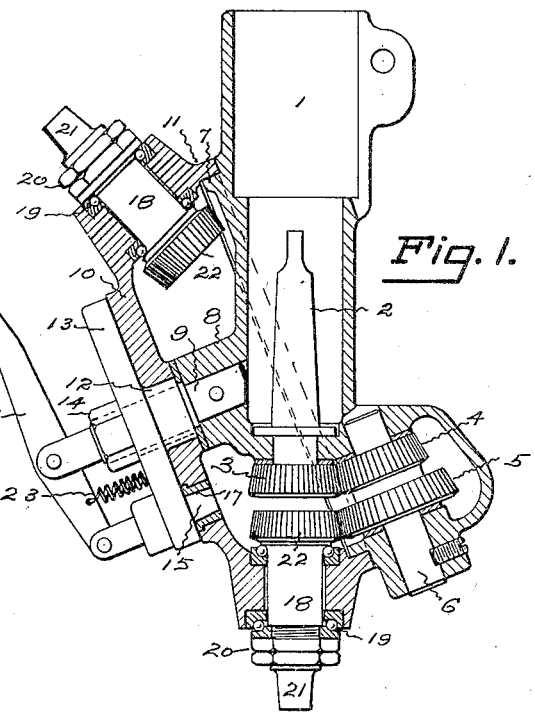
Figure 2:
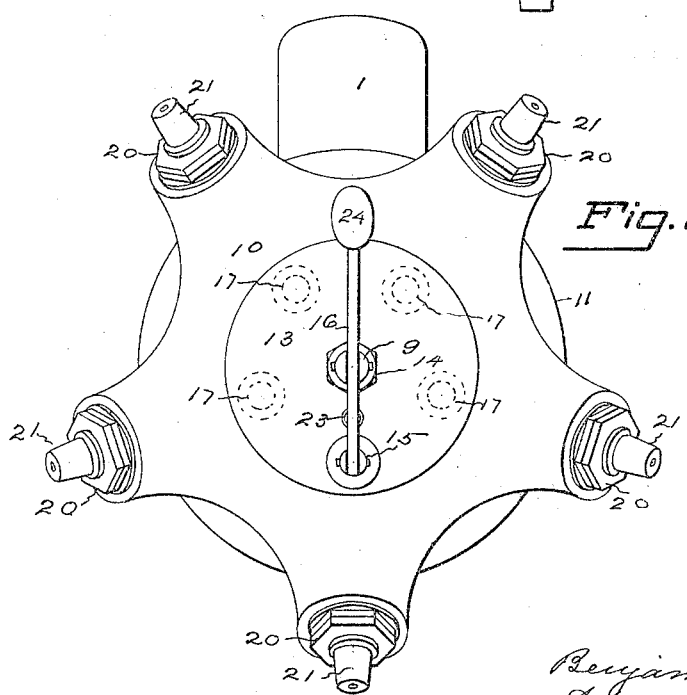

Figure 1 of the accompanying drawings shows a central vertical section of a head which embodies this invention. Fig. 2 shows a front view of the same.

The supporting member 1 of the head is tubular and is designed to be clamped upon the reciprocatory feed-sleeve of a drill press. Extending up into this member is a rotatable driving stem 2 that is designed to engage with the rotatory drill spindle when the member is clamped upon the sleeve. Fastened on the lower end of this driving stem is a bevel gear 3. This bevel gear meshes with a bevel gear 4 fastened to which is a bevel gear 5. The gears 4 and 5 are mounted at one side so as to turn freely on the arbor 6 which is angularly arranged in a part of the supporting member of the head. This member, on one side and extending at an angle with the axis of the member, has a hub 7 and projecting from the head at the center of this hub is a boss 8. A stud 9 is fastened into the boss so as to project from the center at right angles to the plane of the hub.

The adjustable member 10 of the head has an annular flange 11 that it fitted to turn about the hub 7 of the supporting member. At the center the adjustable member has an opening that fits and turns on the sleeve 12 which projects inwardly from the plate 13 that is keyed upon the stud. This plate is secured in place so as to hold the adjustable member in position by the nut 14 which is screwed upon a threaded portion of the stud. The plate 13 carries a pin 15, the outer end of which is connected with a lever 16 that is pivoted in the end of the stud. A spring 23 is arranged to draw the lever in such manner as to normally cause the pin to project into one of the locking sockets 17 that are formed in the face of the adjustable member. When the handle end 24 of the lever is pressed inward the pin is withdrawn so that the adjustable member of the head may be rotated.

The adjustable member of the head shown carries five chuck spindles 18 that are mounted upon suitable bearings 19 located in the head. These spindles are retained in place by lock nuts 20 and their outer ends 21 are shaped to receive tool holding chucks. On the inner end of each spindle is a bevel gear 22. The chuck spindles are so located and the angular relation of the adjustable member to the supporting member is such that when the locking pin is out the adjustable member may be rotated to bring any desired one of the chuck spindles into line with the driving stem which is in line with the drill spindle, and when one of these chuck spindles is thus brought into line its gear turns into mesh with the transmission gear 5. When a chuck spindle is located in position for use the locking pin springs into an index socket and holds the adjustable member firmly in correct working position. As a result of the angular relation of the axis of the adjustable head to the axis of the driving stem, the same being nearly 90°, the axis of the tool in use is in line with the axis of the spindle of the press while the tools which are not in use do not project forwardly so far as to render them dangerous or to inconvenience the operator of the machine when the head is in use, and as a result of the employment of the bevel transmission gears, which give the desired speed, and are arranged on but a slight angle the head does not extend down below the lower end of the drill press sufficiently far to reduce the working space between the table and the press to any practical extent.

The invention claimed is;

1. A multiple tool head for drill press comprising a tubular supporting member having a stud projecting downward and outward from one side, a driving stem extending axially into the supporting member, a bevel gear fastened to the lower end of the driving stem, an arbor retained by the supporting member and extending downward and outward with relation to the axis of the driving stem, a pair of bevel gears mounted on said arbor, said gears being fastened together and the upper being in mesh with the gear on the end of the driving stem, an adjustable member rotatably mounted on said stud, a nut screwed on the stud and retaining the adjustable member in place, rotatory chuck spindles mounted in the adjustable member, a bevel gear secured to the end of each chuck spindle, said gears being adapted to mesh with the lower of the transmission gears when the chuck spindle to which a gear is fastened is turned into line with the driving stem, and means for locking the adjustable member to the supporting member with either of the chuck spindles in line with the driving stem.

2. A multiple tool head for drill press comprising a tubular supporting member having a boss extending downward and outward from one side, a driving stem extending axially into the supporting member, a bevel gear fastened to the lower end of the driving stem, an arbor retained by the supporting member and extending downward and outward with relation to the axis of the driving stem, a pair of bevel gears mounted on said arbor, said gears being fastened together and the upper being in mesh with the gear on the end of the driving stem, a stud projecting from the boss, an adjustable member rotatably mounted on said stud, said adjustable member being provided with locking sockets, a plate keyed to said stud outside of the adjustable member, means on the stud for holding said plate against the adjustable member, a locking pin extending through an opening in said plate, a lever pivoted to the outer end of the stud and connected with the outer end of the locking pin, a spring for thrusting the pin into a locking socket in the adjustable member, chuck spindles mounted in the adjustable member, and bevel gears secured to the ends of the chuck spindles, each of said gears being adapted to mesh with the lower of the transmission gears when the chuck spindle to which a gear is fastened is turned into line with the driving stem.

3. A multiple tool head for drill press comprising a tubular supporting member having an angularly disposed hub on one side and a boss projecting from the center of the hub, a driving stem extending axially into the supporting member, a bevel gear fastened to the lower end of the driving stem, an arbor extending downwardly and outwardly in one side of the supporting member, a pair of bevel gears turning on said arbor, said gears being fastened together and the upper being in mesh with the gear on the end of the driving stem, a threaded stud projecting downwardly and outwardly from the boss, an adjustable member fitting and turning on the hub, said adjustable member being provided with locking sockets, a plate keyed to said stud and having a sleeve extending through the adjustable member, a nut screwed on the stud and holding the plate against the adjustable member, a locking pin extending through an opening in said plate, a lever pivoted to the outer end of the stud and connected with the outer end of the locking pin, a spring connected between the plate and lever for thrusting the pin into a locking socket in the adjustable member, rotatory chuck spindles mounted in the adjustable member, and bevel gears secured to the ends of the chuck spindles, each of said gears being adapted to mesh with the lower of the transmission gears when the chuck spindle to which a gear is fastened is turned into line with the driving stem.

BENJAMIN P. FORTIN.